(12) United States Patent
Smith et al.

(10) Patent No.: US 12,129,209 B2
(45) Date of Patent: Oct. 29, 2024

(54) AL ADDITIONS FOR GRAIN PINNING IN Y2O3—MgO

(71) Applicant: Raytheon Company, Waltham, MA (US)

(72) Inventors: Kenneth Smith, East Longmeadow, MA (US); Stephanie Silberstein Bell, North Andover, MA (US); Christopher S. Nordahl, Littleton, MA (US); Thomas M. Hartnett, Nashua, NH (US); Richard Gentilman, Acton, MA (US); R. Wesley Jackson, Mystic, CT (US)

(73) Assignee: RAYTHEON COMPANY, Tewksbury, MA (US)

( * ) Notice: Subject to any disclaimer, the term of this patent is extended or adjusted under 35 U.S.C. 154(b) by 108 days.

(21) Appl. No.: 17/648,921

(22) Filed: Jan. 25, 2022

(65) Prior Publication Data

US 2022/0259107 A1  Aug. 18, 2022

Related U.S. Application Data

(60) Provisional application No. 63/150,448, filed on Feb. 17, 2021.

(51) Int. Cl.
*C04B 35/505* (2006.01)
*C04B 35/04* (2006.01)
(Continued)

(52) U.S. Cl.
CPC ............ *C04B 35/505* (2013.01); *C04B 35/04* (2013.01); *C04B 35/62605* (2013.01);
(Continued)

(58) Field of Classification Search
CPC . C04B 35/505; C04B 35/04; C04B 35/62605; C04B 2235/3206;
(Continued)

(56) References Cited

U.S. PATENT DOCUMENTS 8,445,822 B2  5/2013  Sunne
9,012,823 B2  4/2015  Sunne et al.
(Continued)

FOREIGN PATENT DOCUMENTS

CN  109369183 A  2/2019

OTHER PUBLICATIONS

Zhang, Chi, et al. "Achieving ultrahigh dielectric breakdown strength in MgO-based ceramics by composite structure design." Journal of Materials Chemistry C 7.26 (2019): 8120-8130. (Year: 2019).*

(Continued)

*Primary Examiner* — Bryan D. Ripa
*Assistant Examiner* — Cameron K Miller
(74) *Attorney, Agent, or Firm* — Kinney & Lange, P. A.

(57) ABSTRACT

A nanocomposite optical ceramic (NCOC) material. The material having a first solid phase, a second solid phase, and a third solid phase. The first solid phase has first solid phase grains no larger than 5 µm, and each first solid phase grain has a first solid phase grain boundary. The second solid phase has second solid phase grains no larger than 5 µm, and each second solid phase grain has a second solid phase grain boundary. The third solid phase has a doping agent. The doping agent is less than 5 atomic % soluble in the first solid phase and the second solid phase. At least part of the third solid phase is situated at the second solid phase grain boundary.

6 Claims, 4 Drawing Sheets

(51) Int. Cl.
*C04B 35/626* (2006.01)
*B82Y 20/00* (2011.01)
*B82Y 30/00* (2011.01)
*B82Y 40/00* (2011.01)

(52) U.S. Cl.
CPC .............. *B82Y 20/00* (2013.01); *B82Y 30/00* (2013.01); *B82Y 40/00* (2013.01); *C04B 2235/3206* (2013.01); *C04B 2235/3217* (2013.01); *C04B 2235/3225* (2013.01); *C04B 2235/402* (2013.01); *C04B 2235/5454* (2013.01); *C04B 2235/785* (2013.01); *C04B 2235/85* (2013.01); *C04B 2235/9646* (2013.01)

(58) Field of Classification Search
CPC .... C04B 2235/3217; C04B 2235/3225; C04B 2235/402; C04B 2235/5454; C04B 2235/785; C04B 2235/85; B82Y 20/00; B82Y 30/00; B82Y 40/00
See application file for complete search history.

(56) References Cited

U.S. PATENT DOCUMENTS 9,395,467 B2  7/2016  Zelinski et al.
2008/0318761 A1* 12/2008  Riedel .................... C01F 17/34
                                       252/301.4 F
2013/0299749 A1* 11/2013  Tsutsumi ............ C04B 35/6261
                                       501/120
2014/0231727 A1*  8/2014  Zelinski ................ C04B 35/505
                                       252/582
2018/0341047 A1  11/2018  Korenstein et al.

OTHER PUBLICATIONS

K Okada, T Sakuma, "Role of Zener's Pinning Effect on Grain Growth in Al2O3—ZrO2," Journal of the Ceramic Society of Japan, 100 382-386 (1992).

J Wang, L Zhang, D Chen, EH Jordan, M Gell, "Y2O3—MgO—ZrO2 Infrared Transparent Ceramic Nanocomposites," Journal of the American Ceramic Society, 95:3 1033 (2012).

ZD Fleischman, VL Blair, N Ku, LD Merkle, "Dual Phase Er:Y2O3/MgO nanocomposites for mid-infrared solid state lasers," Proc SPIE 10637, Laser Technology for Defense and Security XIV, 106370Z (May 4, 2018).

L Xue, K Meyer, I-W Chen, "Control of grain boundary pinning in Al2O3/ZrO2 Composites with Ce3+/Ce4+ doping," Journal of the American Ceramic Society, 73 822-829 (1992).

B-K Jang, "Microstructure of nano SiC dispersed in Al2O3—ZrO2 composites," Materials Chemistry and Physics, 93 337-341 (2005).

HJ Ma, WK Jung, Y Park, DK Kim, "A novel approach of an infrafred transparent Er:Y2O3—MgO nanocomposite for eye-safe laser ceramics," Journals of Materials Chemistry C 6 11096-11103 (2018).

* cited by examiner

AL ADDITIONS FOR GRAIN PINNING IN Y2O3—MgO

BACKGROUND

The present disclosure relates generally to optical elements and, more particularly, to the fabrication of optical elements formed of nanocomposite optical ceramic (NCOC) materials.

NCOC materials have been developed for use in commercial and military optical imaging systems. NCOC materials have been used to form optical elements, including domes and windows, which can provide infrared (IR) transmittance while shielding imaging components from the external environment in which they are deployed. NCOC domes and windows have been successfully manufactured using near-net shape powder processing techniques. Nano-sized ceramic powders are formed in a mold and pressed to produce a green body having a general shape of the optical element but with increased thickness. The green bodies are then sintered to remove any organics added during powder processing and to achieve a high density (>96% of theoretical density). Finally, hot isostatic pressing (applying pressure and heat) to the sintered body forms a fully densified blank having a near-net shape of the optical element. Final shape finishing, including precision grinding and polishing, is provided to achieve a final shape of the optical element.

New compositions are desirable to provide more stable optical properties and enhanced mechanical integrity.

SUMMARY

A nanocomposite optical ceramic (NCOC) material has a first solid phase, a second solid phase, and a third solid phase. The first solid phase has first solid phase grains no larger than 5 µm, and each first solid phase grain has a grain boundary. The second solid phase has grains no larger than 5 µm, and each second solid phase grain has a second solid phase grain boundary. The third solid phase has a doping agent. The doping agent is less than 5 atomic % soluble in the first solid phase and the second solid phase. At least part of the third solid phase is situated at the second solid phase grain boundary.

A method for producing a nanocomposite optical ceramic (NCOC) material includes providing a first nanocomposite powder, providing a second nanocomposite powder, providing a doping agent, mixing the first nanocomposite powder, the second nanocomposite powder, and the doping agent to form a mixed powder, and sintering the mixed powder to form a nanocomposite. The doping agent is less than 5 atomic % soluble in the first nanocomposite powder and the second nanocomposite powder.

DETAILED DESCRIPTION

The present disclosure is directed to doping nanocomposite optical ceramic (NCOC) materials for optical system application including, but not limited to, electro-optical sensors used for target acquisition, identification, and guidance. Optical domes and windows generally must be transmissive in the infrared (IR) region of the electromagnetic spectrum and capable of protecting the electro-optical sensors and other components, which they shield, from harsh environmental conditions. NCOC materials have been shown to offer enhanced mechanical strength and thermal shock resistance in IR domes and windows, as well as lower emissivity even at elevated temperatures. Current NCOC elements, when subjected to high temperatures, experience grain growth. An increase in grain size decreases the transmissivity of the NCOC. As disclosed herein, prior to sintering, the nanoparticle feedstock can be modified with the addition of a doping agent, which can inhibit grain growth. The NCOC materials described herein have been shown to maintain grain size and transmissivity after being subjected to high temperatures, both in flight and during sintering.

As used herein, the term "nanocomposite optical ceramic (NCOC)" refers to a multi-phase composite material formed of a mixture of two or more ceramic nanoparticle materials that are mutually insoluble. As used herein, the term "nanoparticle" refers to particles having a grain size of less than 1 µm. As used herein, the term "mutually insoluble" refers to a combination of two or more nanoparticle materials that form a multi-phase grain structure having distinct phase separation between two constituents. The multi-phase grain structure remains distinct after processing such that separation between the phases can be observed. The NCOC materials disclosed herein are composite materials that have two or more different nanograins that are dispersed in one another. The different nanograins form material barriers to grain growth of the other and thereby inhibit grain growth during processing. Nanograins can be uniformly dispersed in the NCOC material. As used herein, the term "uniformly dispersed" refers to dispersion in a generally uniform manner such that spacing between nanograins of the same material is generally consistent throughout the NCOC material.

As disclosed, a doping agent is one which is insoluble or has limited solubility in the nanoparticle materials. Due to the limited solubility, pinning phases are formed and segregated from the other grains. The pinning phases can be a new material made up of components of a nanoparticle material and the doping agent, which is in equilibrium with the nanoparticle material. The addition of the dopant provides a means to form an additional phase that can pin grains by either segregating to grain boundaries or occurring as particles in the nanoparticle material that limit grain growth when encountered.

Figure 1:
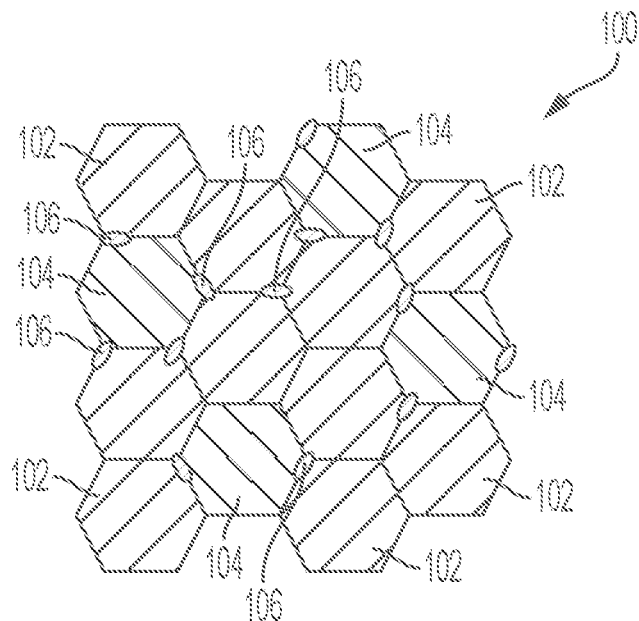
FIG. 1 is a schematic of the thermodynamic equilibrium configuration of the Al doped NCOC.

FIG. 1 is a schematic of the thermodynamic equilibrium configuration of a NCOC 100 described herein. FIG. 1 shows first nanoparticle material grains 102, second nanoparticle material grains 104, pinning phase 106. First nanoparticle material grains 102 and second nanoparticle material grains 104 make up the bulk of the NCOC. Each grain is smaller than the wavelength it is intended to be transparent at. In some embodiments the grain size is less than $\frac{1}{20}^{th}$ of the intended wavelength, less than $\frac{1}{25}^{th}$ of the intended wavelength, or less than $\frac{1}{30}^{th}$ of the intended wavelength. In some embodiments the grains are less than 175 nm, less than 160 nm, or less than 150 nm. First nanoparticle material 102 and second nanoparticle material 104 are mutually insoluble and have a very similar index of refraction. In some embodiments the difference between in the index of refraction is less than 25%, less than 20%, or less than 15%. First nanoparticle material 102 and second nanoparticle material 104 can be oxides. In some embodiments the nanoparticle materials comprise, for example, magnesium oxide, yttrium oxide.

Pinning phase 106 is interspersed between the grains 102, 104 of the NCOC. The doping agent used to create pinning phase 106 has limited solubility in both the first and second nanoparticle materials. In some embodiments pinning phase 106 has a solubility of less than 5 atomic %, less than 3 atomic %, or less than 1 atomic %. In some embodiments, pinning phase 106 is of comparable size to the MgO and $Y_2O_3$ grains. In some embodiments, pinning phase 106 is smaller than the first and second nanoparticle grains 102, 104. In some embodiments pinning phase 106 is less than 20 nm in diameter, less than 10 nm in diameter, or less than 5 nm in diameter. In the context of this application "diameter" means the largest dimension of the particle without requiring a strictly circular cross-section. Pinning phase 106 can be an oxide particle. In some embodiments pinning phase 106 is an oxide comprising the doping agent. The doping agent can be, for example, metallic aluminum, aluminum-containing oxides such as, $Al_2O_3$, either in the equilibrium corundum crystal structural, or meta-stable alumina that may have a spinel crystal structure or as amorphous aluminum oxide, or as amorphous aluminum oxyhydroxide, or aluminum salts such $Al(NO_3)_3$, $Al(OH)_3$, $Al_2(SO_4)_3$, $AlPO_4$, or $Al_2(CO_3)_3$, or a combination thereof. The doping agent can react with one or both nanoparticle materials to form the pinning phase. In some embodiments the pinning phase comprises $Y_4Al_2O_9$, $Y_3Al_5O_{12}$, $YAlO_3$, $MgAl_2O_4$, $Al_2O_3$ or a combination thereof. The doping agent can be no more than 25 volume percent of the NCOC, no more than 10 volume percent of the NCOC, or no more than 5 volume percent of the NCOC.

Figure 2:
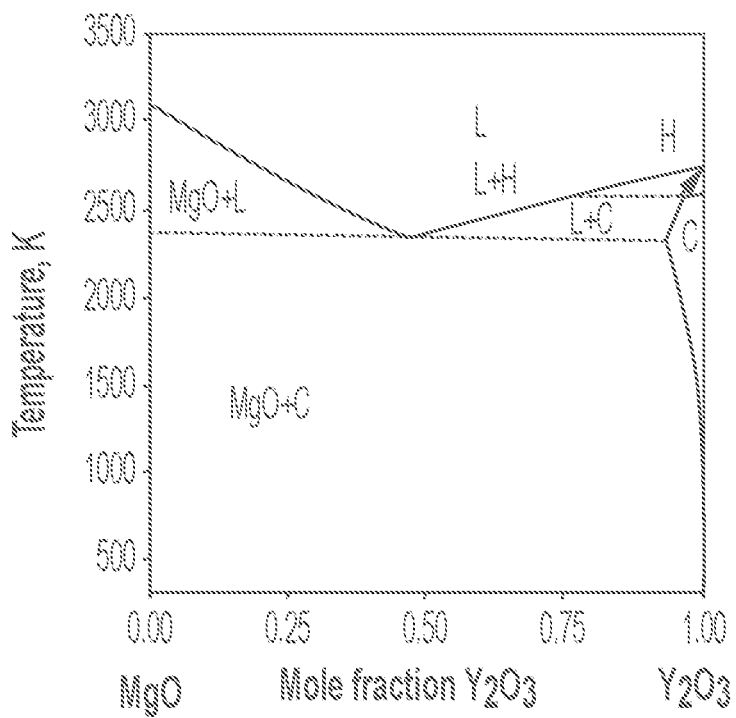
FIG. 2 is a phase diagram of magnesium oxide and yttrium (III) oxide

The NCOC materials can be used for optical system application including, but not limited to, electro-optical sensors used for target acquisition, identification, and guidance. Optical domes and windows must be capable of protecting the electro-optical sensors and other components, which they shield from harsh environmental conditions, including heat from air friction. When on the flight trajectory, the temperature of exterior of the domes and windows can reach as high as 1200° C. At these elevated temperatures, the size of the undoped nanoparticle material grains can grow. The primary constituents of a NCOC may be two materials that are mutually insoluble. An exemplary embodiment is a NCOC composed of MgO and $Y_2O_3$. FIG. 2 shows the MgO—$Y_2O_3$ phase diagram, which shows that $Y_2O_3$ is insoluble in MgO up to the eutectic temperature (2100° C.) and MgO has negligible solubility in $Y_2O_3$ below 1000° C. and less than 10% solubility up to $Y_2O_3$ melting point. In a single-phase system, grain boundary diffusion or bulk diffusion can occur during high temperature densification or plastic deformation, which causes grain growth. The change in grain size can alter optical and mechanical properties of the NCOC material. In mutually insoluble systems, there is no atomic transport (i.e., $Mg^{2+}$ ions do not freely move through the $Y_2O_3$ phase or vice versa), so grain growth is reduced with respect to a single phase material. A further reduction in grain growth can be obtained through the addition of a pinning phase. The addition of a pinning phase creates a barrier to the growth, helping to maintain the desired grain size at higher temperatures. A doped NCOC material described herein can have a transmissivity of 80% at a wavelength of 3 µm at a thickness of 2 mm. When subjected to a temperature of 1400° C., 1500° C., or 1600° C. for 1 hour the doped NCOC material of 2.23 mm will experience a grain growth of no greater than 20%.

Figure 3:
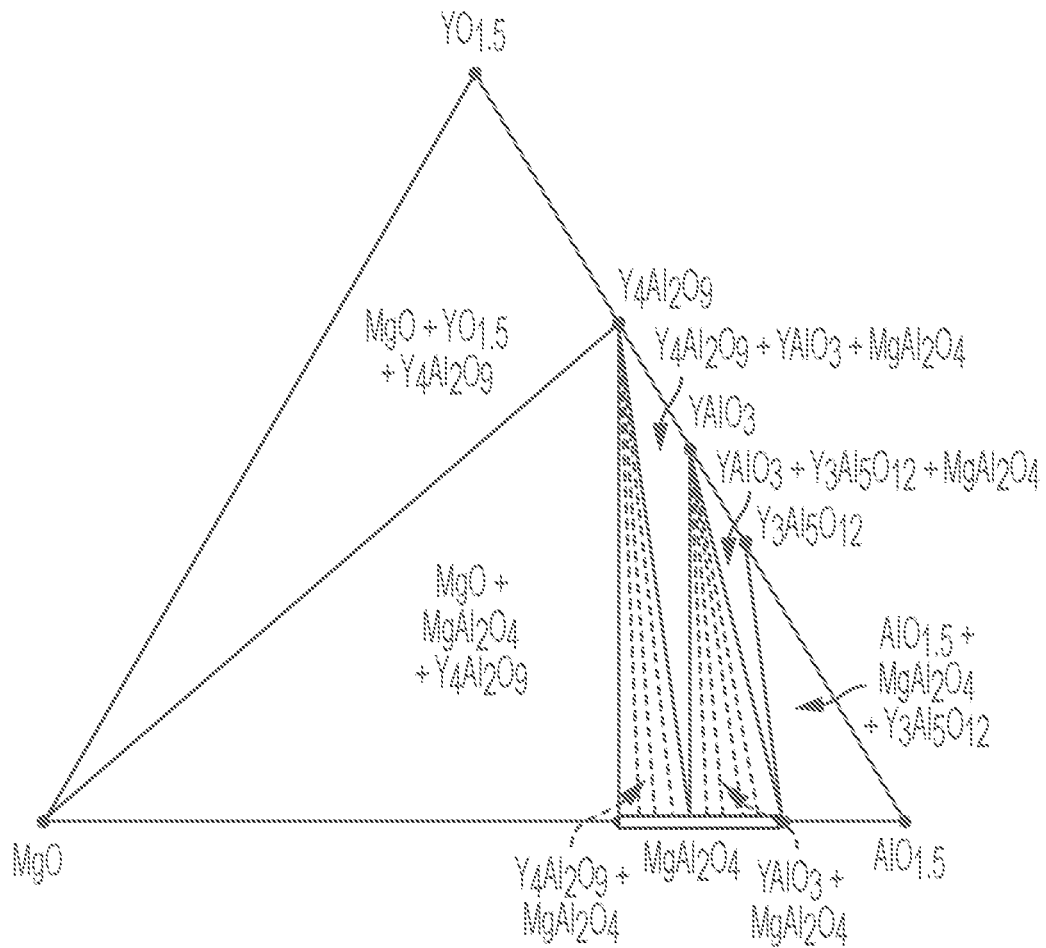
FIG. 3 is an isothermal section of the yttrium (III) oxide, magnesium oxide, and aluminum oxide phase diagram.

FIG. 3 is an isothermal section of the yttrium (III) oxide, magnesium oxide, and aluminum oxide phase diagram (the oxides are presented in single cation form). As illustrated, the three-phase compatibility field of MgO, $YO_{1.5}$, and $Y_4Al_2O_9$ corresponds to the phase assembly in thermodynamic equilibrium for MgO—$Y_2O_3$ ceramics with $Al_2O_3$ additions (shown as the grey triangle). $Al_2O_3$ is insoluble in $Y_2O_3$ (as described below in FIG. 4) and has less than 1 atomic % solubility in MgO below 1600° C. (as described below in FIG. 5). As indicated by the $Al_2O_3$—$Y_2O_3$ phase diagram in FIG. 4, $Al_2O_3$ additions to $Y_2O_3$ result in the formation of $Y_4Al_2O_9$. Compositions with greater than 67% $Y_2O_3$ (balance $Al_2O_3$) consist of 2 phases, $Y_2O_3$ and $Y_4Al_2O_9$, with the relative volume fractions of each phase determined by the Al concentration. As indicated by the $Al_2O_3$—MgO phase diagram in FIG. 5, $Al_2O_3$ additions to MgO result in the formation of $MgAl_2O_4$. Compositions with greater than 50% MgO (balance $Al_2O_3$) consist of 2 phases, MgO and $MgAl_2O_4$, with the relative volume fractions of each phase determined by the Al concentration.

Additions of $Al_2O_3$ to MgO—$Y_2O_3$ composites results in a three phase system consisting of MgO, $Y_2O_3$ and $Y_4Al_2O_9$, as indicated by FIG. 3. The mutual insolubility between the three phases of this system limits atomic transport (i.e. $Y^{3+}$ ions do not move freely though either MgO or $Y_4Al_2O_9$). Only a small amount of a third ceramic phase ($Y_4Al_2O_9$) is needed to inhibit grain growth of the other (MgO and $Y_2O_3$). The ratio of $Y_4Al_2O_9$:$Y_2O_3$+MgO by volume can be between 1:200 and 1:3, be between 1:100 and 1:9, or 1:19.

Figure 4:
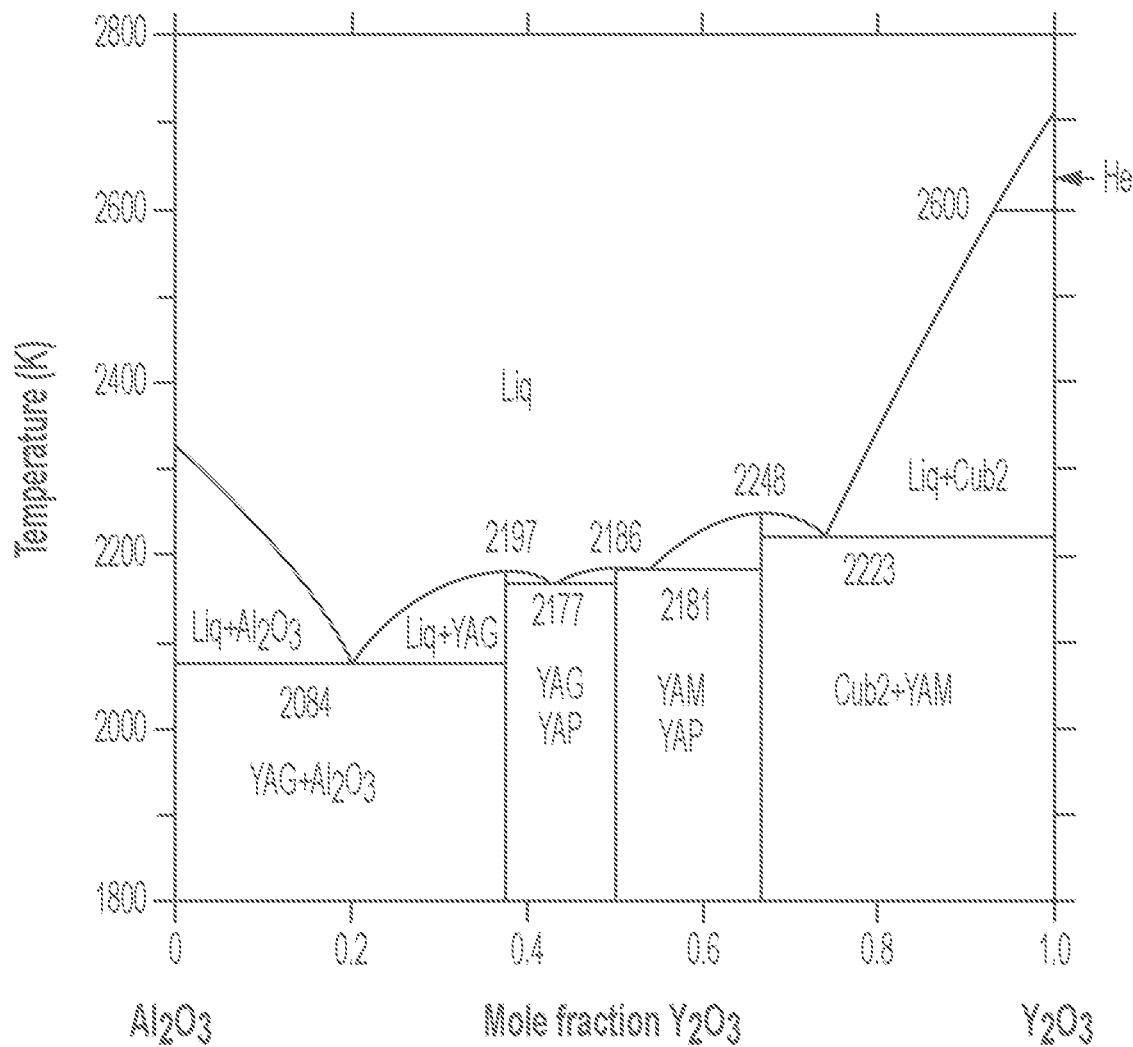
FIG. 4 is a phase diagram of yttrium (III) oxide and aluminum oxide.

FIG. 4 is a phase diagram of $Al_2O_3$:$Y_2O_3$. Six crystalline phases are present in this system: $Al_2O_3$ (corundum); $Y_3Al_5O_{12}$ (yttrium aluminum garnet (YAG)); $YAlO_3$ (yttrium aluminum perovskite (YAP)); $Y_4Al_2O_9$ (yttrium aluminum monoclinic (YAM)); and $Y_2O_3$, below 2600K $Y_2O_3$ is cubic (c-$Y_2O_3$), and is a hexagonal polymorph (h-$Y_2O_3$) between 2600K and its melting point. As illustrated, below the eutectic temperature of 2223K, compositions with greater than 67% $Y_2O_3$ are a mixture of $Y_4Al_2O_9$ and c-$Y_2O_3$. $Al_2O_3$ is insoluble in c-$Y_2O_3$.

Figure 5:
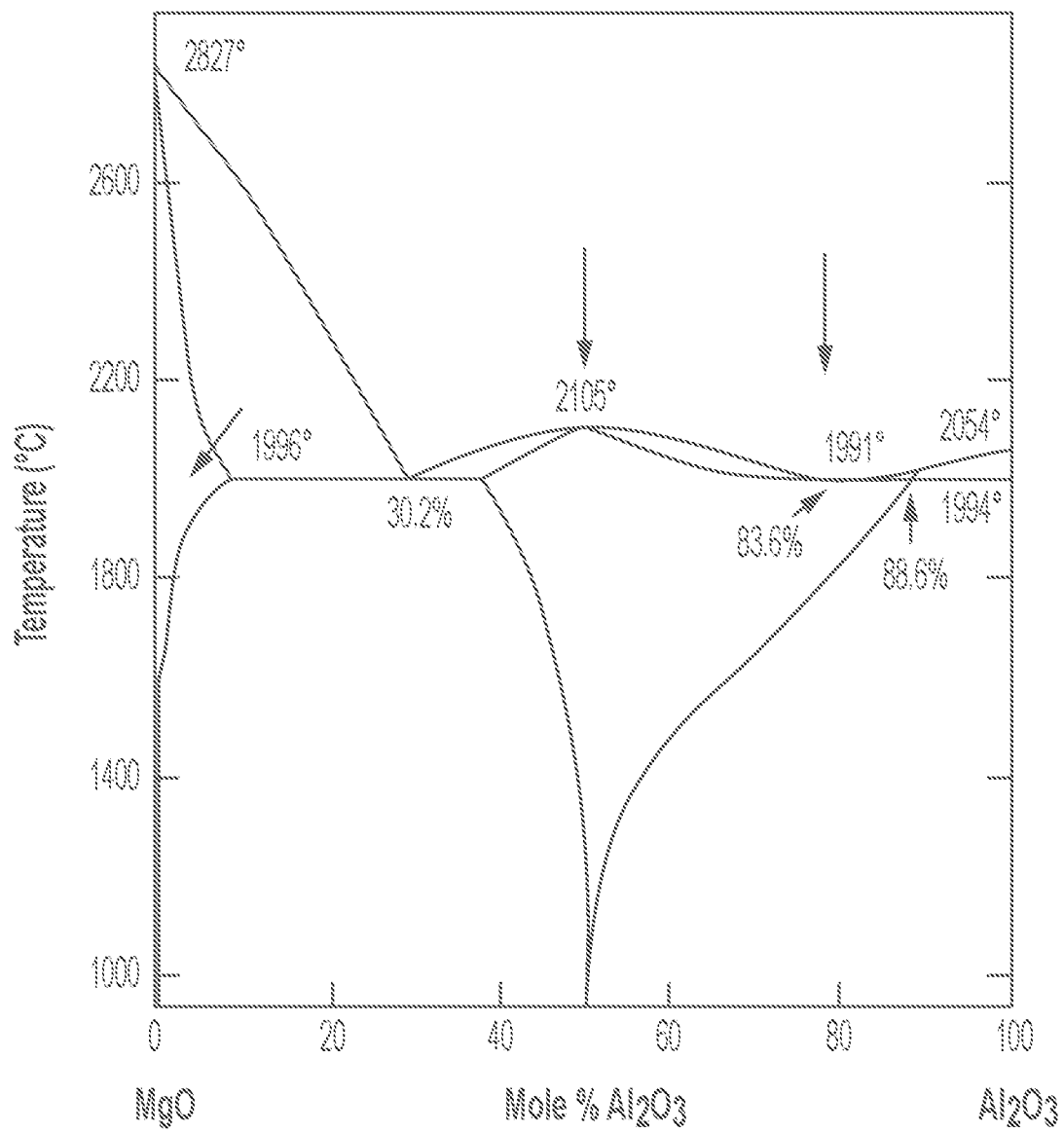
FIG. 5 is a phase diagram of magnesium oxide and aluminum oxide.

FIG. 5 is a phase diagram of MgO: Al2O3. Three crystalline phases are present in the MgO: $Al_2O_3$ system: $Al_2O_3$ (corundum); $MgAl_2O_4$ (spinel); and MgO (periclase). $Al_2O_3$ is insoluble in MgO at temperatures below 1000° C. The $Al_2O_3$ solubility in MgO increases with increasing temperature and at 1600° C. the solubility of $Al_2O_3$ in MgO is about 1 atomic %. $Al_2O_3$ additions to MgO that exceed this solubility limit will tend to form a 2 phase mixture of Al saturated MgO and $MgAl_2O_4$ at temperatures below the eutectic temperature of 1996° C. and at total $Al_2O_3$ concentrations less than 35 to 50% $Al_2O_3$ (depending on the temperature) as illustrated by the phase diagram in FIG. 5.

The doped NCOC can be formed using powder processing techniques or other methods known in the art capable of forming a multi-phase NCOC material. Powder processing can include powder fabrication and preparation, densification, and finishing. The doping agent can be added to one or both nanoparticle material powders by including the doping agent in the powder precursors, using atomic deposition to the powder, adding the doping agent as a liquid by spraying, dipping, or other suitable technique. Powder precursors are used for flame spray pyrolysis (FSP) or other powder production methods. NCOC powders can be formed using a FSP process, which can provide high purity nano-sized particles with controlled particle size and crystallinity. A slurry containing nanopowders formed from FSP can be ground and mixed, for example, in a mill or similar device, to break up agglomerates of material. The doping agent can also take the form of a nanoparticle material that can be created separately by FSP or other methods. The slurry can be filtered to remove impurities and/or particles exceeding a maximum desired particle size. Liquid can be removed from solution and the nanopowder can be dried in a granulation step.

Nanopowders can be dry pressed into the mold to reduce voids. The compacted nanopowders can be sintered to densify the molded compact. Sintering can increase the density of the molded compact to greater than about 96% of theoretical density. Final densification can be achieved by applying a hot isostatic press (HIP) to eliminate any remaining voids and provide a fully dense NCOC. In the context of this disclosure "fully dense" means no more than 0.01% voids per unit volume. Final finishing, including grinding and polishing, can be provided as needed. Grain size of NCOC material can be measured and/or characterization of the optical and mechanical properties of the NCOC can be conducted to verify that the optical and mechanical properties of the NCOC meet the material specifications for the optical element. The optical element can be of any size and shape, including but not limited to disks, hemispherical and ogive domes, lenses, flats, and windows of various sizes (e.g., a few centimeters (cm) in diameter and/or length up to tens of cm in diameter and/or length).

DISCUSSION OF POSSIBLE EMBODIMENTS

The following are non-exclusive descriptions of possible embodiments of the present invention.

A nanocomposite optical ceramic (NCOC) material comprising: a first solid phase, consisting of first solid phase grains no larger than 5 µm, each first solid phase grain having a first solid phase grain boundary; a second solid phase consisting of second solid phase grains no larger than 5 µm, each second solid phase grain having a second solid phase grain boundary; and a third solid phase comprising a doping agent, wherein the doping agent is less than 5 atomic % soluble in the first solid phase and the second solid phase; wherein at least part of the third solid phase is situated at the second solid phase grain boundary.

The NCOC of the preceding paragraph can optionally include, additionally and/or alternatively, any one or more of the following features, configurations and/or additional components:

A further embodiment of the foregoing NCOC, wherein the first solid phase comprises magnesium oxide.

A further embodiment of any of the foregoing NCOC, wherein the first solid phase comprises magnesium oxide.

A further embodiment of any of the foregoing NCOC, wherein the second solid phase comprises yttrium (III) oxide.

A further embodiment of any of the foregoing NCOC, wherein the doping agent comprises aluminum, aluminum oxide, or some combination thereof.

A further embodiment of any of the foregoing NCOC, wherein the first solid phase comprises magnesium oxide, the second solid phase comprises yttrium (III) oxide, and the doping agent comprises aluminum, aluminum oxide, or some combination thereof.

A further embodiment of any of the foregoing NCOC, the size of the first solid phase grain is less than 1 µm.

A further embodiment of any of the foregoing NCOC, wherein the size of the first solid phase grain is less than 0.5 µm.

A further embodiment of any of the foregoing NCOC, wherein the doping agent is no more than 5 volume % of the NCOC.

A further embodiment of any of the foregoing NCOC, wherein the first solid phase grains grow no more than 20% after being subjected to 1400° C. for 1 hour.

A further embodiment of any of the foregoing NCOC, wherein the NCOC has a transmission of at least 80% at a wavelength of 3 µm wherein the NCOC is 2 mm thick.

A method for producing a nanocomposite optical ceramic (NCOC) material, the method comprising: providing a first nanocomposite powder, providing a second nanocomposite powder, providing a doping agent, wherein the doping agent is less than 5 atomic % soluble in the first nanocomposite powder and the second nanocomposite powder; mixing the first nanocomposite powder, the second nanocomposite powder, and the doping agent to form a mixed powder; and sintering the mixed powder to form a nanocomposite.

The method of the preceding paragraph can optionally include, additionally and/or alternatively, any one or more of the following features, configurations and/or additional components:

A further embodiment of the foregoing method, further comprising: adding the doping agent to the second nanocomposite powder to form a doped nanocomposite powder; and mixing the first nanocomposite powder with the doped nanocomposite powder to form the mixed powder.

A further embodiment of any of the foregoing methods, wherein the doping agent is added to the second nanocomposite powder by atomic layer deposition.

A further embodiment of any of the foregoing methods, wherein the doping agent is added to the second nanocomposite powder as a liquid coating.

A further embodiment of any of the foregoing methods, wherein the first nanocomposite powder comprises magnesium oxide.

A further embodiment of any of the foregoing methods, wherein the second nanocomposite powder comprises yttrium (III) oxide.

A further embodiment of any of the foregoing methods, wherein the doping agent comprises aluminum.

A method for producing a nanocomposite optical ceramic (NCOC) material, the method comprising: providing a first nanocomposite powder and a second nanocomposite powder, providing a doping agent, wherein the doping agent is less than 5% atomic soluble in the first nanocomposite powder and the second nanocomposite powder; mixing the first nanocomposite powder and the second nanocomposite powder with the doping agent to form a mixed powder; and sintering the mixed powder to form a nanocomposite.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A nanocomposite optical ceramic (NCOC) material comprising:

a first solid phase, consisting of first solid phase grains no larger than 5 µm, each first solid phase grain having a first solid phase grain boundary, wherein the first solid phase comprises magnesium oxide;
a second solid phase consisting of second solid phase grains no larger than 5 μm, each second solid phase grain having a second solid phase grain boundary, wherein the second solid phase comprises yttrium (III) oxide; and
a third solid phase comprising a doping agent, wherein the doping agent is less than 5 atomic % soluble in the first solid phase and the second solid phase, wherein the doping agent comprises aluminum, aluminum oxide, or some combination thereof;
wherein the doping agent combines with the first solid phase or the second solid phase to form a pinning phase that is interspersed between grains of the first solid phase and the second solid phase such that a three-phase system of $MgO$, $Y_2O_3$ and $Y_4Al_2O_9$ is formed, wherein the three-phase system has a ratio of $Y_4Al_2O_9$:$Y_2O_3$+$MgO$ of between 1:200 and 1:3.

2. The NCOC of claim 1 wherein the size of the first solid phase grain is less than 1 μm.

3. The NCOC of claim 1 wherein the size of the first solid phase grain is less than 0.5 μm.

4. The NCOC of claim 1 wherein the doping agent is no more than 5 volume % of the NCOC.

5. The NCOC of claim 1 wherein the first solid phase grains grow no more than 20% after being subjected to 1400° ° C. for 1 hour.

6. The NCOC of claim 1 wherein the NCOC has a transmission of at least 80% at a wavelength of 3 μm wherein the NCOC is 2 mm thick.

* * * * *